S. BROWN.
DUMP CAR.
APPLICATION FILED APR. 1, 1918.

1,282,183.

Patented Oct. 22, 1918.
3 SHEETS—SHEET 1.

WITNESS:

Stanley Brown, INVENTOR.
BY
Albert Scheibl
ATTORNEY

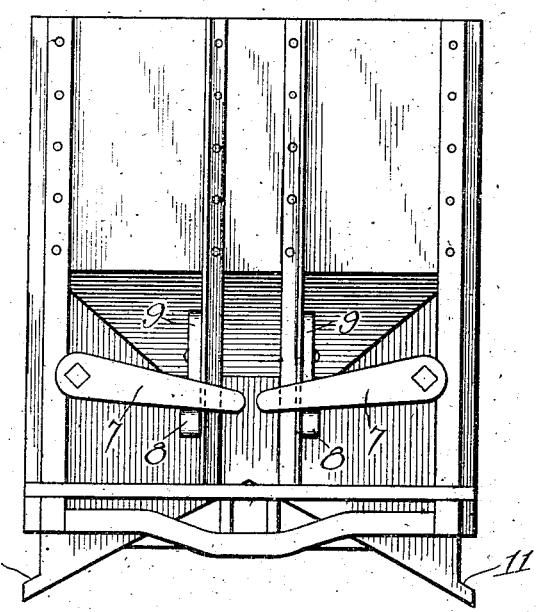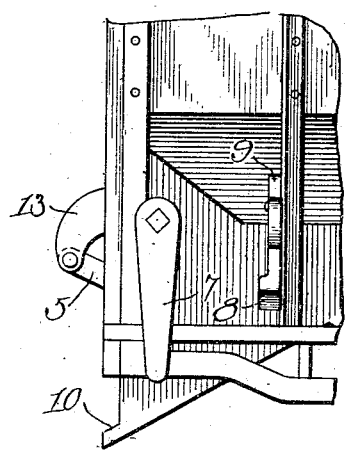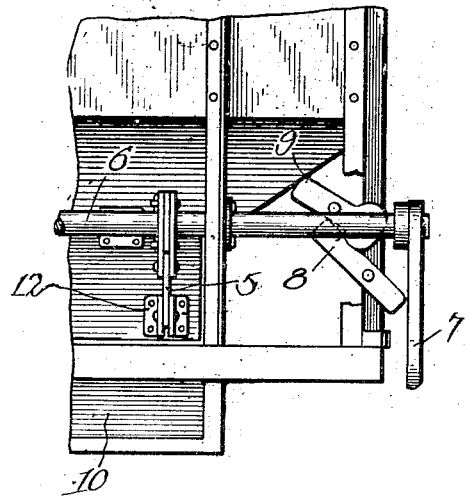

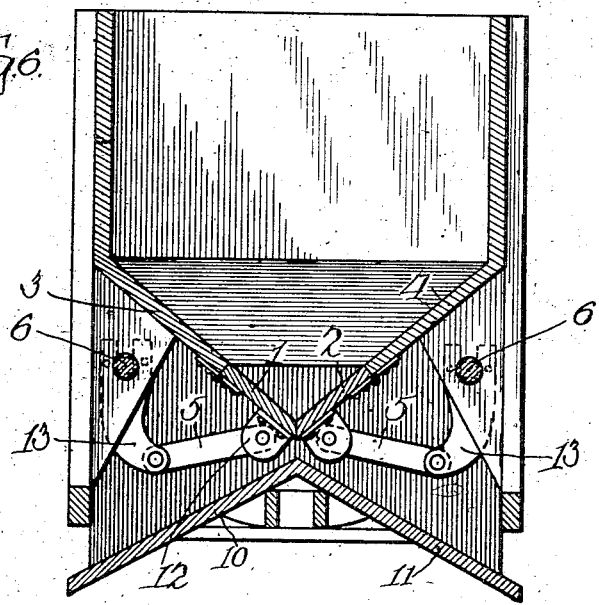
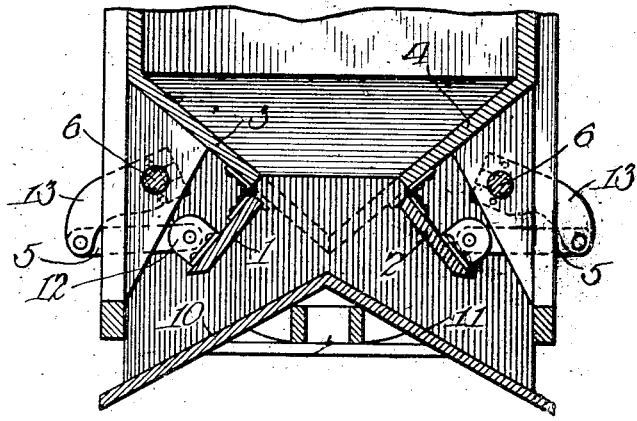
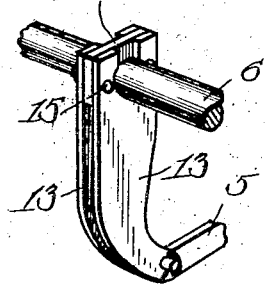
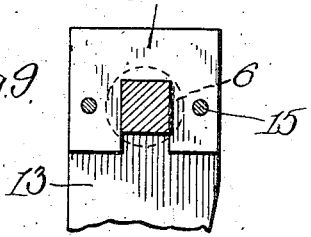

UNITED STATES PATENT OFFICE.

STANLEY BROWN, OF CHICAGO, ILLINOIS.

DUMP-CAR.

1,282,183.   Specification of Letters Patent.   Patented Oct. 22, 1918.

Application filed April 1, 1918. Serial No. 225,919.

*To all whom it may concern:*

Be it known that I, STANLEY BROWN, a citizen of the United States, residing at Chicago, in the county of Cook and State of Illinois, have invented certain new and useful Improvements in Dump-Cars; and I do hereby declare the following to be a full, clear, and exact description of the invention, such as will enable others skilled in the art to which it appertains to make and use the same.

My invention relates to dump cars, its general objects being to provide a simple, easily and safely manipulated, durable and easily repaired dumping arrangement, and desirably to provide a dumping arrangement which will readily permit the dumping of the contents of the car upon one or the other side of the car, or upon both sides. More particularly, my invention aims to provide a dump car with a bottom so shaped as to guide the contents toward two swinging flaps which converge downwardly toward each other; also to provide inclined chutes substantially forming continuations of these flaps and extending downwardly and laterally of the car beyond the car wheels, so that the moving of either one of the flaps out of its normal position will permit the entire contents of the car to slide by gravity out of the car and to be dumped at one side of the track. Likewise, my invention aims to provide simple means whereby the two flaps may be swung to their open positions rapidly, so as to permit them to be opened substantially at the same time, thereby causing the approximately equal dumping of the contents of the car upon both sides of the track.

In another phase of my invention, it aims to provide simple means for moving each of the closure portions of the bottom of the car (which portions are desirably in the form of hinged or swinging flaps) into or out of their closure positions, to provide a construction which will enable the interlinked portions of the flap-moving mechanism to be made of sheet steel, and to provide simple and accessible means for detaching any desired part of this mechanism in case repairs should be needed.

In still another phase of my invention, it aims to provide a dump-opening and closing arrangement which can easily be manipulated by one man, and which will not expose him to the danger of accidents from moving parts. It also aims to provide simple and sturdily constructed means for locking the dump-closing means for each side of the car in its closure position, to provide simple means for unlatching this locking mechanism, also, to utilize gravity independent of all springs or other delicate parts for maintaining the parts interlocked, thereby avoiding an accidental opening of the dumping parts of the car. Furthermore, my invention aims to dispose all parts of the dumping and latching mechanism so that they will readily be accessible from the sides and from one end of the car without stooping under the car, and without detaching any of the frame portions of the car, so that any repairs needed can be made wherever the car happens to be placed, without switching the car to a repair shop or paying further attention to its momentary location. Moreover, my invention aims to arrange the dumping mechanism so that the closure portion can be moved from its normal position by swinging an arm which affords ample leverage and thereby enables one man to attend to this swinging and to the latching of the mechanism. Still other objects will appear from the following specification and from the accompanying drawings, which drawings are presented merely as showing one embodiment of my invention, it being understood that the same could be varied in many ways without departing from what I claim as new.

In the drawings, Figure 1 is a side levation of a dump-car equipped with the mechanism of my invention.

Fig. 3 is an end view of the car with the dumping mechanism in its normal or closure position.

Fig. 4 is a fragmentary end view showing the parts in the position in which they are Fig. 5 is a fragmentary side view, showing the latching parts in their unlatched position.

Fig. 6 is a central transverse section through Fig. 1, with portions of the framework and of the trucks omitted.

Fig. 7 is a similar but fragmentary view showing the bottom doors or flaps in their open position.

Fig. 8 is a perspective view of a part of one of the rock shafts and of the arm mounted on the same.

Fig. 9 is an enlarged transverse section taken through Fig. 8 to one side of the plate 14.

In the embodiment of the drawings, my invention is shown as applied to a dump-car having a bottom consisting of portions sloping from the two ends and two sides of the car toward two pivoted flaps 1 and 2, which flaps normally afford continuations of the sloping bottom parts 3 and 4 of the hopper, as shown in Fig. 6.

Figure 1:
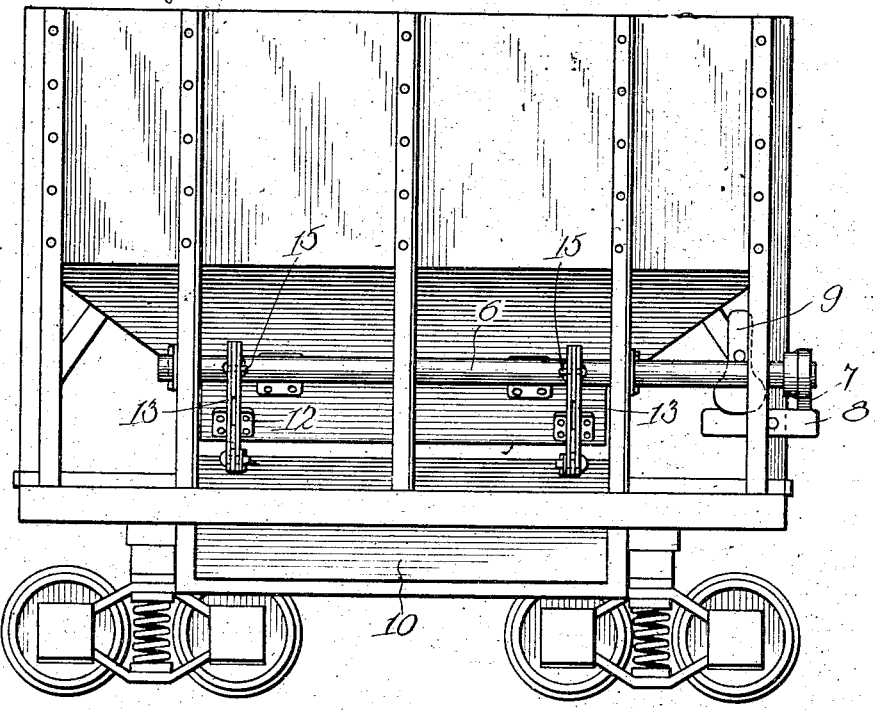
Figure 2:
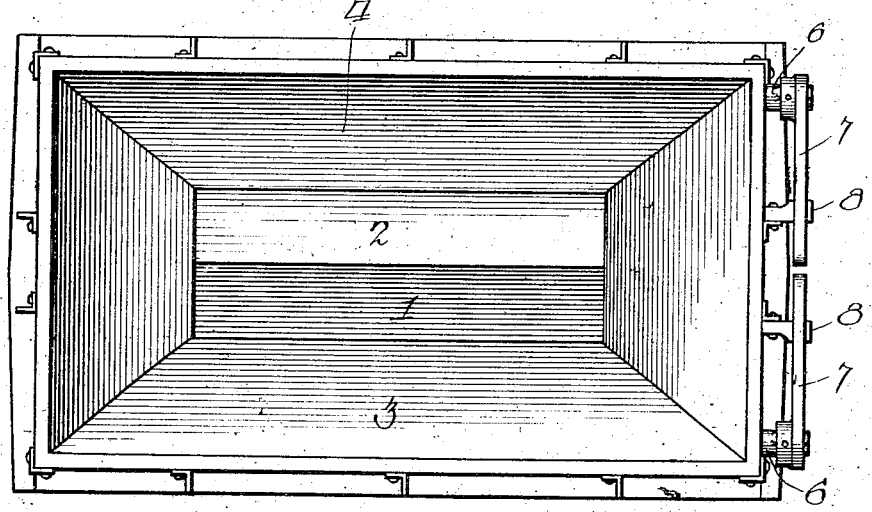
Fig. 2 is a plan view of the same.

Each of the pivoted flaps or doors 1 and 2 is connected by a link 5 to an arm fastened rigidly to a rock-shaft 6, which rock-shaft extends below one of the inclined bottom portions of the hopper and is adapted to be moved by a lever 7 at one end of the car. This lever 7 is normally held in the positions of Figs. 1, 2 and 3 by a rocker arm 8 extending lengthwise of the car, which rocker arm is maintained in its said position by a pivoted latch or dog 9. These parts are desirably so arranged that both the weight of the lever 7 and the pressure of the contents of the car as transmitted through the link 5 and the rock-shaft 6 press the lever 7 downwardly against the outer end of the rocker arm 8, thereby pressing the inner end of this rocker arm upwardly against the weighted lower end of the dog or latch 9. Consequently, the said pressure tends continuously to maintain the latch and the rocker arm in the normal positions of Figs. 1 and 3, thus holding the flaps 1 and 2 firmly closed.

When the contents of the car are to be dumped toward either side of the track, the dog 9 is swung out of its normal position into the position of Fig. 5, this being readily done by tapping the upper end of the dog 9 with a crowbar. When this is done, the downward pressure of the free end of the lever 7 forces the rock-bar 8 into the inclined position of Fig. 5, thus permitting the lever 7 to clear the outer end of this rock-bar and allowing the shaft 6 to rotate until the lever 7 points substantially downwardly. In being thus rotated, the shaft 6 moves the arms which are connected through the links 5 with the flaps 1 and 2, thus opening these flaps as shown in Fig. 7 and permitting the contents of the car to slide down along the inclined guideways 10 and 11. These guideways extend under the hopper and approximately form continuations for the inclined bottom portions of the hopper of the car, so as to coöperate with the latter in guiding the contents of the car laterally past the wheels and the rails. Where the dumping is to be upon only one side of the track, as for example at the left hand, the left hand lever 7 may alone be unlatched, thereby swinging the flap 1 to its open position as shown in Fig. 7, while still leaving the flap 2 in the position shown in dotted lines in the same figure. Then the contents of the car will be dumped toward the left down the guideway 10, or to the left of the track. It will be obvious that by leaving the flap 1 closed and only opening the flap 2, the entire contents of the car could similarly be dumped to the right of the track down the guideway 11. Likewise, by opening both of the flaps 1 and 2, which can be done quickly by successively tapping the two dogs 9, the contents of the car will be distributed at the two opposite sides of the track. Thus, the dumping can readily be directed where desired, and as the latches 9 can easily be reached from either the end or the side of the car, this dumping can be effected even while the car is in motion, thereby saving time and distributing the contents of the car somewhat along the track. Moreover, it will be noticed that when the dumping is to be entirely toward one side of the track, only one of the latches 9 is moved and no attention whatever needs to be paid to the other or to the flap controlled by the latter.

To prevent the various parts of the mechanism from being jarred out of their normal positions, I preferably equip the latch 9 and the rocker arm 8 with interengaging formations, as for example by providing the arm 8 with a recess entered by the lower end of the latch 9. I also desirably thicken the outer end of the rocker arm 8 so as to overbalance its inner end and thereby maintain both this arm and the latch 9 in the oblique position of Fig. 5 when the lever is unlatched, thus permitting the lever 7 to be swung back to its normal position without touching the other parts. When the lever 7 has thus been returned to its normal position of Fig. 3, the upper end of the latch 9 can readily be pulled outwardly of the car, so as to return both the latch 9 and the rocker arm 8 to their normal positions. This can easily be done by one man and requires no particular skill.

Instead of using castings for connecting the rock-shaft 6 with the pivoted flaps, I preferably employ parts formed of steel plate, and desirably mount steel bracket plates 12 on the flaps, which plates are pivoted to the links 5. The outer end of each link 5 is desirably pivoted between two steel plates 13 (as shown in Fig. 8) which plates have upper end portions straddling a part of the rock-shaft 6, and which plates are secured to each other by fasteners extending through a companion plate 14. For this purpose, I desirably reduce a part of the rock-shaft 6 to an angular cross section as shown in Fig. 9 and provide the plates 13 and 14 with recesses matching these angles, so that when these plates are fastened in position as in Figs. 8 and 9, the angular portion of the shaft will engage the walls of the said recesses, thereby preventing a rotation of the arms 13 about the said shaft. However, by simply removing the fasteners 15 which extend through overlapped portions of the plates 13 and 14, these plates may be detached from the shaft, thereby permitting a repairing or replacing of the same in case they become badly worn or damaged. To allow for this, I desirably use fasteners 15 of a type which may be easily detached, as for instance a pin having a head on one end and having near its other end a transverse bore through which a spring cotter extends, such fasteners being too commonly known in the art to require a detailed illustration. I also desirably provide similar simple means for mounting the parts 7, 8 and 9, so that any or all of these may readily be detached if necessary, it being obvious from Figs. 3 and 5 that these parts are all readily accessible from one end of the car. Likewise, it will be seen from Fig. 1 that the arms 13, links 5 and bracket plates 12 are all accessible from the side of the car, so that any needed repairs can easily and conveniently be made wherever the car happens to be, thereby avoiding the waste of time in taking the car to repair shops. However, the simplicity of the construction, and the strength which may obviously be given to the various parts should make my arrangement so durable that repairs would only be required after long intervals, or in case of such accidents as may be due to collisions or a derailing of the car. So also, it will be understood that the dumping mechanism of my invention may be applied equally well to cars of other shapes and other types of framing, various parts being shown rather diagrammatically in the drawings to simplify the latter. Moreover, while I have shown each of the movable flaps as connected to one of the rock-shafts by means of two links and two arms, I do not wish to be limited to these or other details of the construction and arrangement here disclosed, it being obvious that the same might be modified in many ways without departing from the spirit of my invention as shown in the appended claims.

I claim as my invention:

1. In a dump car, a bottom including a movable closure, a rock shaft, means connecting the closure and shaft to operate the former from the latter, a radial lever connected to the rock shaft and extending transversely across an end of the car, a normally horizontal rocker arm pivoted between its ends and extending longitudinally of the car and having its outer end arranged to extend below the lever and to support the latter, and a normally vertically disposed latch pivoted between its ends and having its lower end formed to engage the inner end of the rocker arm to hold the latter in lever supporting position and having its upper end free and in unlatched position extending beyond the inner end of the rocker arm.

2. In a dump car, a movable closure, a rock shaft, means connecting the closure and rock shaft for operating the former from the latter, a lever on the rock shaft, a rocker arm pivoted between its ends and having its outer end engageable beneath the lever to support the latter, and a latch pivoted between its ends and at a point above and adjacent to the inner end of the rocker arm and in such relation thereto so that when the latch is in latched position it lies vertically and when in unlatched position it lies with its lower end extending between the pivot and inner end of the rocker arm and with its upper end free and extending beyond the inner end of the rocker arm.

3. In a dump car, a bottom including a movable closure, a rock shaft, a link pivoted to the closure at one end thereof, and an arm composed of a pair of side plates having their lower ends engaged with the respective opposite sides of the other end of the link and having their upper ends slotted and receiving the shaft through said slots, a transverse plate received between the upper ends of the side plates and extending across the slots of the side plates and having a downwardly extending slot the walls of which are engaged with the top and opposite side portions of the shaft, and means to secure the ends of the transverse plate to the upper ends of the side plates whereby upon removal of the securing means the transverse plate may be removed and the side plates also removed by moving each at right angles to the shaft.

4. In a dump car, a bottom including a movable closure, an arm composed of a pair of side plates having forked upper ends receiving the shaft and disengageable therefrom by moving the plates at right angles to the shaft, a bridging plate extending across the space between and removably secured to the forks of the side plates and engaged with the top portion of the shaft, and means to connect the arm to the closure.

5. In a dump car, a bottom including a movable closure, means to operate the closure including a lever normally extending horizontally, a rocker arm pivoted between its ends and having its outer end engaged with the under side of the lever to hold the latter horizontal, and a latch pivoted between its ends and having its lower end arranged to engage on top of the rocker arm between the inner end and the pivot thereof and having its upper end free.

Signed at Chicago, Illinois, March 25th, 1918.

STANLEY BROWN.